United States Patent [19]
Graf et al.

[11] Patent Number: 5,618,139
[45] Date of Patent: Apr. 8, 1997

[54] OUTBOARD ROLLER RESTRAINER FOR HANDLING CARGO IN VEHICLE

[75] Inventors: Michael C. Graf, Lomita; Edward Moradians, Canoga Park, both of Calif.

[73] Assignee: Ancra International Corporation, Hawthorne, Calif.

[21] Appl. No.: 546,686

[22] Filed: Oct. 23, 1995

[51] Int. Cl.$^6$ ....................................................... B60P 7/08
[52] U.S. Cl. .............................. 410/69; 410/86; 410/92; 410/94
[58] Field of Search ................... 410/77, 80, 86, 410/92, 94, 95, 69, 104, 105; 248/500, 503; 244/118.1, 137.1

[56] References Cited

U.S. PATENT DOCUMENTS

| | | |
|---|---|---|
| 3,480,239 | 11/1969 | Jensen et al. |
| 3,741,504 | 6/1973 | Alberti et al. ........................ 410/92 X |
| 3,927,622 | 12/1975 | Voigt . |
| 4,109,891 | 8/1978 | Grandahl . |
| 5,011,348 | 4/1991 | Jensen et al. ........................... 410/69 X |
| 5,112,173 | 5/1992 | Eilenstein et al. ..................... 410/92 X |
| 5,234,297 | 8/1993 | Wieck et al. ........................... 410/94 X |
| 5,316,242 | 5/1994 | Eilenstein-Wiegmann et al. . 410/69 X |

FOREIGN PATENT DOCUMENTS 1413948  11/1975  United Kingdom ..................... 410/69

*Primary Examiner*—Karen B. Merritt
*Assistant Examiner*—Stephen Gordon

[57] ABSTRACT

A roller restraint assembly is removably mounted on the floor of a vehicle in an outboard location where it restrains cargo movement laterally but permits longitudinal cargo movement along its roller. This assembly has a pivotally mounted restraint arm which engages the base portion of a cargo pallet and restrains the pallet against vertical movement. When the cargo is moved longitudinally it drives the restraint arm aside on its pivot, thereby permitting longitudinal movement of such cargo. A roller is rotatably mounted on the assembly to facilitate longitudinal movement of the cargo while restraining lateral movement thereof. The roller further has a dampener incorporated therein which dampens and attenuates the impact of loads thereagainst.

3 Claims, 2 Drawing Sheets

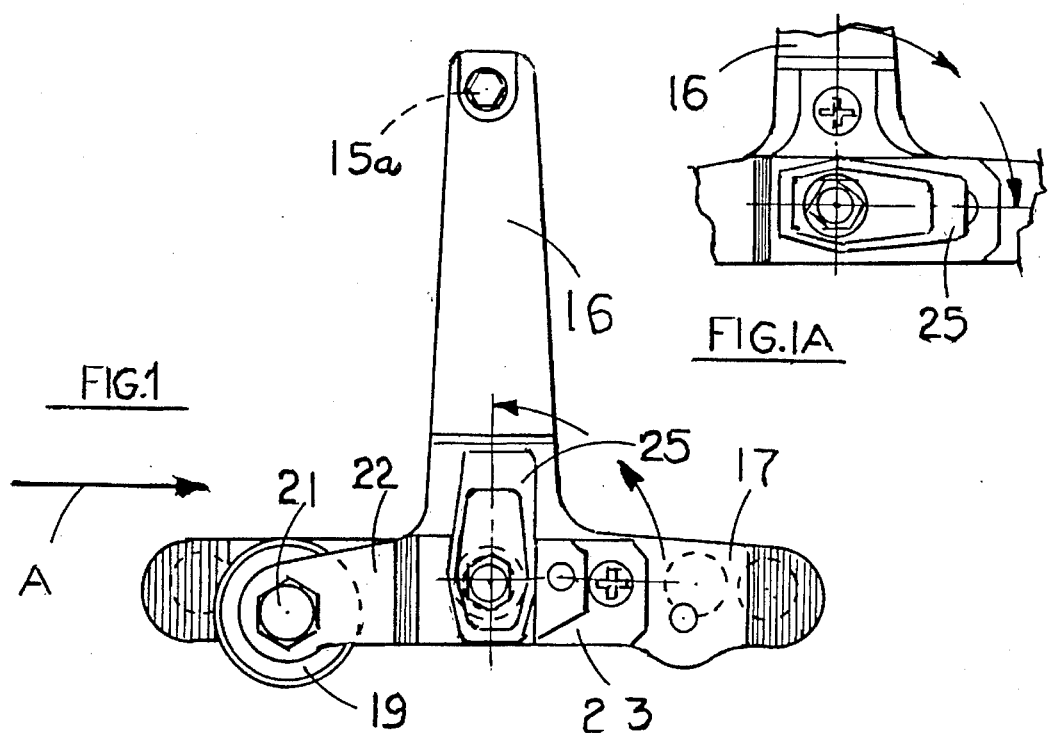
FIG.1
FIG.1A
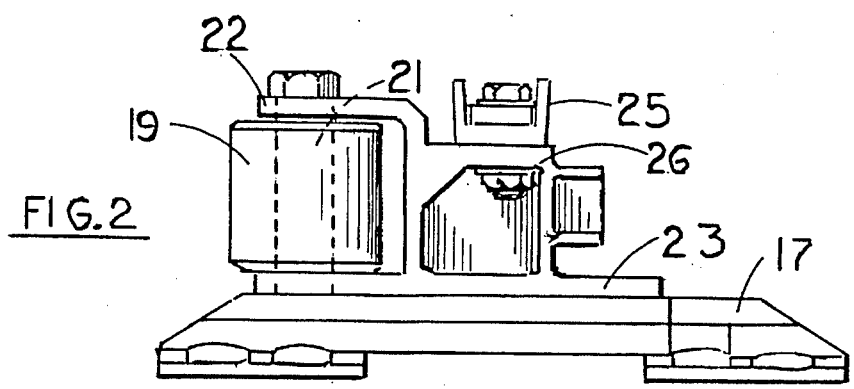
FIG.2
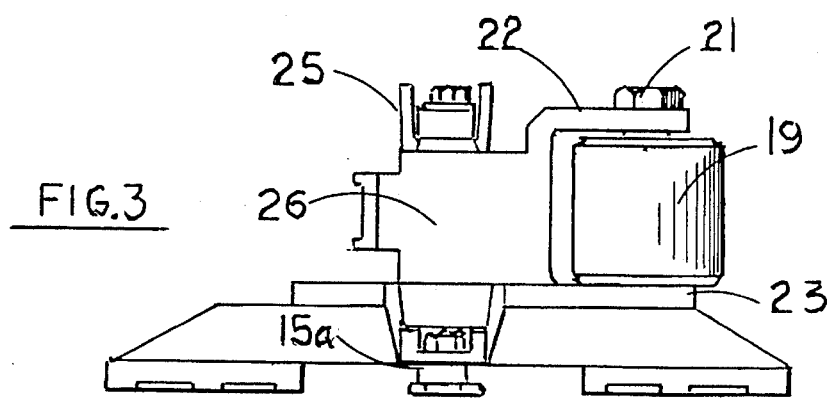
FIG.3

5,618,139

OUTBOARD ROLLER RESTRAINER FOR HANDLING CARGO IN VEHICLE

BACKGROUND OF THE INVENTION

1. Field of the Invention

This invention relates to cargo loading systems for use in loading cargo into a vehicle such as an aircraft and more particularly to an outboard restraint device which restrains lateral and vertical movement of cargo but permits longitudinal movement thereof.

2. Description of the Related Art

Roller and restraint assemblies which are removably mounted on tracks attached to the floor of a vehicle such as an aircraft or truck are widely used for loading and unloading cargo in such vehicles. Such prior art assemblies are described in U.S. Pat. No. 3,480,239 issued Nov. 25, 1969 to Jensen, et al.; U.S. Pat. No. 4,109,891 issued Aug. 29, 1978 to Grendahl; and U.S. Pat. No. 3,927,622 issued Dec. 23, 1975 to Voigt. Such assemblies of the prior art generally employ rollers and restrainers mounted in the assembly to facilitate movement of the cargo in a single direction and restrain movement in other directions in loading the vehicle. Once the cargo is loaded, movement of any sort should be restrained. Restraints are generally provided to prevent both lateral as well as vertical cargo movement. There are situations, however, where some longitudinal cargo movement may be required in the loading and unloading operations. This often requires some adjustment or reinstallation of the handling assemblies on the mounting tracks.

BRIEF SUMMARY OF THE INVENTION

The assembly of the present invention provides lateral-(outboard) restraint of the cargo as well as vertical restraint but permits longitudinal cargo positioning without the need for any adjustment or reinstallation of such assembly. This end result is achieved by employing a T-shaped assembly which has a pivotally supported vertical restraint arm mounted on the cross-arm of the "T" which can be pushed aside by cargo moving longitudinally. At the same time, a roller, which is mounted on the cross arm of the "T" for rotation about a vertical axis, is provided to facilitate such longitudinal movement, this roller also functioning as a stop member to prevent lateral cargo movement and align loads. The roller has a dampener incorporated therein which dampens impact forces.

It is therefore an object of the invention to provide outboard and vertical restraint to the movement of cargo loaded in a vehicle while permitting longitudinal movement of such cargo:

It is a further object of the invention to provide an improved outboard cargo restraint assembly which dampens the impact of loads and with which longitudinal cargo movement is permitted.

Other objects of the invention will become apparent in connection with the following description in conjunction with the accompanying drawings.

BRIEF DESCRIPTION OF THE DRAWINGS

FIG. 1 is a top plan view of a preferred embodiment of the invention;

FIG. 1A is a top plan view of the vertical restraint of the preferred embodiment shown in its withdrawn position;

FIG. 2 is a rear elevational view of the preferred embodiment;

FIG. 3 is a front elevational view of the preferred embodiment;

DETAILED DESCRIPTION OF THE INVENTION

Referring to FIGS. 1–6, the preferred embodiment of the invention is shown.

The assembly is removably mounted by being "rocked" into place on a pair of tracks (not shown) by means of lugs 15a and 15b. This type of attachment is well known in the art and is described, for example, in U.S. Pat. No. 3,480,239 issued Nov. 25, 1969 to Jensen, et al.

The assembly is T-shaped having a first arm portion 16 and a second arm portion 17 which extends normally from the first arm portion. The assembly is normally mounted on the tracks(not shown) with arm portion 17 positioned in an outboard portion of the cargo floor. As already noted, the assembly is removably mounted on the tracks by means of lugs 15a and 15b which are retained in channels formed in such tracks.

Figure 4:
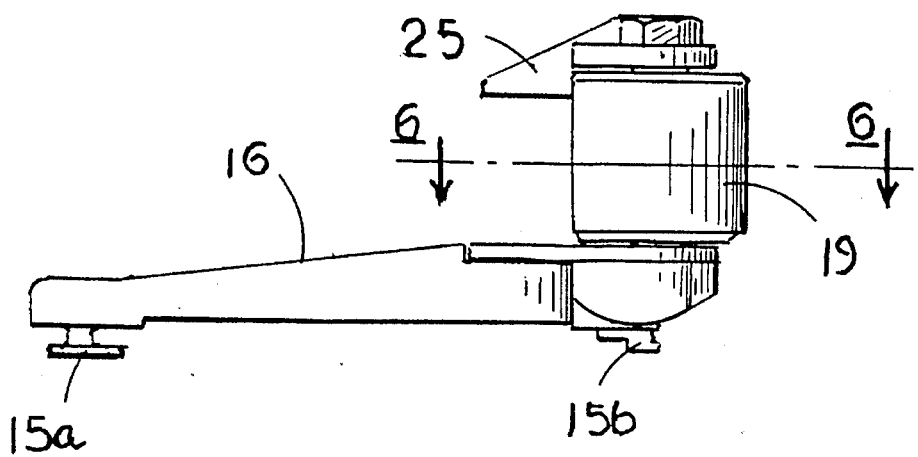
FIG. 4 is a left side elevational view of the preferred embodiment.
Figure 5:
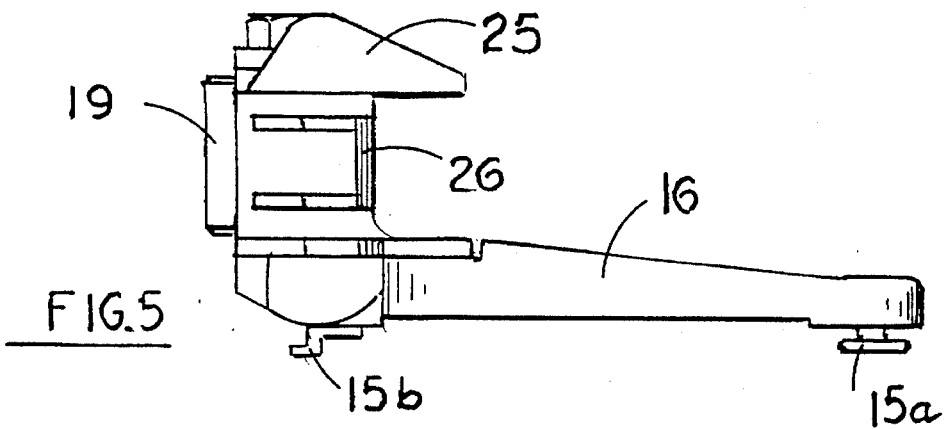
FIG. 5 is a right side elevational view of the preferred embodiment.
Figure 6:
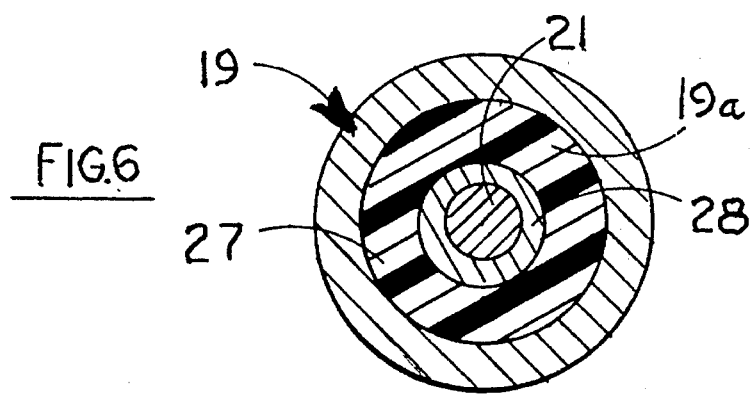
FIG. 6 is a cross sectional view taken along the plane indicated by 6—6 in FIG. 4 and showing the roller of the preferred embodiment.

Roller 19 is rotatably mounted on shaft 21 which is fixedly supported between opposing arms 22 and 23 which are attached to the second arm portion 17 which forms the cross arm of the "T" assembly. As can be seen in FIG. 6, there is a dampener 27 which may be formed of a suitable plastic such as urethane between inner tube 28 and the inner surface 19a of the roller. This provides dampening for loads impacting against the roller. Vertical restraint arm 25 is pivotally supported on platform 26 which is fixedly attached to arm portion 17 and extends upwardly therefrom. The restraint arm is urged to the position shown in FIGS. 1, 4 and 5 by a spring.

When cargo is being moved along the cargo floor adjacent to arm portion 17 in the direction indicated by arrow "A" in FIG. 1, it rolls along roller 19, thus facilitating its movement. Vertical restraint arm 25 yields to the movement of the cargo and is pushed aside against its spring tension, as indicated in FIG. 1A. After the cargo has passed, the restraint arm is returned by its spring tension to its normal at rest position.

While the invention has been described and illustrated in detail, it is to be clearly understood that this is intended by way of illustration and example only and is not to be taken by way of limitation, the scope of the invention being limited only by the terms of the following claims.

We claim:

1. A roller restraint assembly for mounting on the floor of a vehicle for restraining cargo movement in the vehicle in a first outboard direction but permitting cargo movement in a direction normal to said first direction comprising:

first and second arm portions extending in mutually perpendicular directions and forming a T-shaped configuration with said second arm portion forming the cross arm of said "T" shape, a vertical restraint arm for restraining vertical movement of the cargo, said vertical restraint arm being supported on said second arm portion for pivotal motion about an axis normal to the longitudinal axes of both said first and second arm portions, said vertical restraint arm being spaced from said first arm portion thereabove, and a roller mounted on said second arm portion for rotation about a vertical axis normal to the longitudinal axes of said first and second arm portions, said roller including a tube rotatably supported on said second arm portion, an outer cylindrical member, and a dampener interposed between the outer surface of said tube and the inner surface of said outer cylindrical member, said roller facilitating cargo movement parallel to the longitudinal axis of said second arm portion and restraining cargo movement in an outboard direction normal to the longitudinal axis of said second arm portion.

2. The roller restraint assembly of claim 1 and further including a platform fixedly attached to said second arm portion, said vertical restraint arm being pivotally mounted on said platform.

3. The roller restraint assembly of claim 1 and further including a pair of opposing arms mounted on said second arm portion of said assembly, a shaft mounted between said opposing arms, said roller being rotatably supported on said shaft.

* * * * *